US012683414B1

(12) United States Patent
Fechalos et al.

(10) Patent No.: US 12,683,414 B1
(45) Date of Patent: Jul. 14, 2026

(54) AUTOMATIC STATE OF CHARGE MANAGEMENT SYSTEM FOR LITHIUM-ION BATTERIES

(71) Applicant: C&C Power, Inc., Carol Stream, IL (US)

(72) Inventors: William Fechalos, Aurora, IL (US); William Conrardy, Elmhurst, IL (US); Paul Blake, Crystal Lake, IL (US); James Leifker, Plainfield, IL (US); Omar Calderon, Woodstock, IL (US); Matt Sampalis, Chicago, IL (US); Marco Rodriguez, Bartlett, IL (US)

(73) Assignee: C&C Power, Inc., Carol Stream, IL (US)

( * ) Notice: Subject to any disclaimer, the term of this patent is extended or adjusted under 35 U.S.C. 154(b) by 0 days.

(21) Appl. No.: 19/381,651

(22) Filed: Nov. 6, 2025

(51) Int. Cl.
| | |
|---|---|
| *H01M 10/44* | (2006.01) |
| *G08B 21/18* | (2006.01) |
| *H01M 10/42* | (2006.01) |
| *H01M 10/46* | (2006.01) |
| *H01M 10/48* | (2006.01) |
| *H01M 50/244* | (2021.01) |
| *H01M 50/251* | (2021.01) |

(Continued)

(52) U.S. Cl.
CPC .............. *H02J 7/56* (2026.01); *G08B 21/185* (2013.01); *H01M 10/425* (2013.01); *H01M 10/441* (2013.01); *H01M 10/443* (2013.01); *H01M 10/486* (2013.01); *H01M 50/244* (2021.01); *H01M 50/251* (2021.01); *H02J 7/44* (2026.01); *H02J 7/62* (2026.01); *H02J 7/64* (2026.01); *H02J 7/751* (2026.01); *H02J 7/825* (2026.01); *H02J 7/84* (2026.01);

(Continued)

(58) Field of Classification Search
CPC ........ H02J 7/56; H02J 7/44; H02J 7/64; H02J 7/62; H02J 7/84; H02J 7/825; H01M 10/486; H01M 10/443; H01M 10/441; H01M 2010/4271
USPC ................. 320/107, 112, 115, 116, 132, 149
See application file for complete search history.

(56) References Cited

U.S. PATENT DOCUMENTS 10,536,007 B2 * 1/2020 Beaston .............. H01M 50/204

FOREIGN PATENT DOCUMENTS

| CN | 116918147 A | * 10/2023 | ......... H01M 50/204 |
| CN | 119547295 A | * 2/2025 | ............ H01M 10/48 |

OTHER PUBLICATIONS

High-Rate Battery Tester Kikusui PFX2731S, Electronic Design, dated Jun. 20, 2025 (4 pages).

(Continued)

*Primary Examiner* — Edward Tso
(74) *Attorney, Agent, or Firm* — Crowell & Moring LLP

(57) ABSTRACT

According to one or more embodiments, a system, spares cabinet, and method for maintaining a state of charge of spare batteries. The spare cabinet may include an enclosure, a plurality of batteries with given states of charge stored within the enclosure, a charger and a load to charge and discharge the batteries to a storage or transportation state of charge. The spares cabinet may also include a controller configured to maintain the plurality of batteries at the storage or transportation state of charge by causing the charger or load to charge or discharge batteries, and a multiplexor configured to electrically couple the batteries to the controller. The spares cabinet may further include a human-machine interface coupled to the controller that is configured to receive inputs to the system and to display a current state of charge for the batteries.

20 Claims, 8 Drawing Sheets

(51) Int. Cl.
    *H02J 7/44*         (2026.01)
    *H02J 7/56*         (2026.01)
    *H02J 7/62*         (2026.01)
    *H02J 7/64*         (2026.01)
    *H02J 7/70*         (2026.01)
    *H02J 7/82*         (2026.01)
    *H02J 7/84*         (2026.01)

(52) U.S. Cl.
    CPC ............... *H01M 2010/4271* (2013.01); *H01M 2010/4278* (2013.01); *H01M 2220/10* (2013.01)

(56)               References Cited

OTHER PUBLICATIONS

MP Narada, LiFePO$_4$—MPLHP-5125528 Battery System—Setup and Configuration Manual, Narada Power Source Co., Ltd, Revision 1, dated Jan. 18, 2024 (24 pages).

MP Narada, LiFePO$_4$—MPLhP 51.2V 55Ah Battery System—Installation Manual, Revision 8.0, dated Jan. 31, 2025 (69 pages).

MP Narada, LiFePO$_4$ —MPLHP-5125528 & MPLHP-5125525 Battery Systems—Operation and Maintenance Manual, Revision 8.0, dated Jan. 31, 2025 (36 pages).

MP Narada, LiFePO$_4$—MPLHP51255 Battery System—Service Manual, Revision 6, dated Jan. 25, 2024 (15 pages).

MP Narada, MPLhE-Series, High-Rate Data Center UPS Battery System—160 Cell 512VDC, MPLhE5128082—V0, dated Jul. 2023 (2 pages).

MP Narada, MPL-Series, High-Rate Data Center UPS Battery System—144 Cell 461VDC 352kW, MPL51211050—V2, dated Jan. 2025 (2 pages).

MP Narada, MPLhP-Series, High-Rate Data Center UPS Battery System—144/160 Cell 461/512VDC, MPLhP51255—V1, dated Aug. 2022 (2 pages).

* cited by examiner

104

110

AUTOMATIC STATE OF CHARGE MANAGEMENT SYSTEM FOR LITHIUM-ION BATTERIES

FIELD

This disclosure relates generally to the field of power delivery, and more particularly to lithium-ion batteries.

BACKGROUND

A battery energy storage system (BESS), battery storage power station, battery energy grid storage (BEGS) or battery grid storage is a type of energy storage technology that uses a group of batteries in the grid to store electrical energy. Many BESS systems are composed of securely sealed battery packs, which are electronically monitored and replaced once their performance falls below a given threshold.

SUMMARY

Embodiments relate to a system, spares cabinet, and method for maintaining a state of charge of spare batteries. According to one aspect, a system for maintaining a state of charge of spare batteries is provided. The system may include a plurality of batteries at given states of charge, a charger configured to charge each of the plurality of batteries, and a load configured to discharge each of the plurality of batteries, where the charger and the load are configured to charge or discharge each of the plurality of batteries to a storage or transportation state of charge. The system may also include a controller configured to maintain each of the plurality of batteries at the storage or transportation state of charge by causing the charger or load to respectively charge or discharge one or more batteries from the plurality of batteries. The system may further include a multiplexor configured to electrically couple each of the plurality of batteries to the controller and a human-machine interface coupled to the controller, where the human-machine interface is configured to receive inputs to the system and to display a current state of charge for each of the plurality of batteries.

According to another aspect, a spares cabinet for maintaining a state of charge of spare batteries is provided. The spares cabinet may include an enclosure configured to enclose one or more components, a plurality of batteries stored within the enclosure with given states of charge, a charger configured to charge each of the plurality of batteries, and a load configured to discharge each of the plurality of batteries, where the charger and the load are configured to charge or discharge each of the plurality of batteries to a storage or transportation state of charge. The spares cabinet may also include a controller configured to maintain each of the plurality of batteries at the storage or transportation state of charge by causing the charger or load to respectively charge or discharge one or more batteries from the plurality of batteries. The spares cabinet may further include a multiplexor configured to electrically couple each of the plurality of batteries to the controller and a human-machine interface coupled to the controller, where the human-machine interface is configured to receive inputs for the controller and to display a current state of charge for each of the plurality of batteries.

According to yet another aspect, a method for maintaining a state of charge of spare batteries is provided. The method may include providing a system, including a charger configured to charge a plurality of batteries, a load configured to discharge the plurality of batteries, a controller configured to maintain each of the plurality of batteries at a storage or transportation state of charge by causing the charger or load to respectively charge or discharge one or more batteries from the plurality of batteries, and a multiplexor configured to electrically couple each of the plurality of batteries to the controller, where one battery of the plurality of batteries is coupled at a given time. Each of the plurality of batteries are disconnected from the system, and each battery of the plurality of batteries has a given state of charge. One or more parameters of a battery from the plurality of batteries are read, and based on the parameters, a determination is made as to whether or not to charge or discharge the battery to a target state of charge.

DETAILED DESCRIPTION

Figure 1:
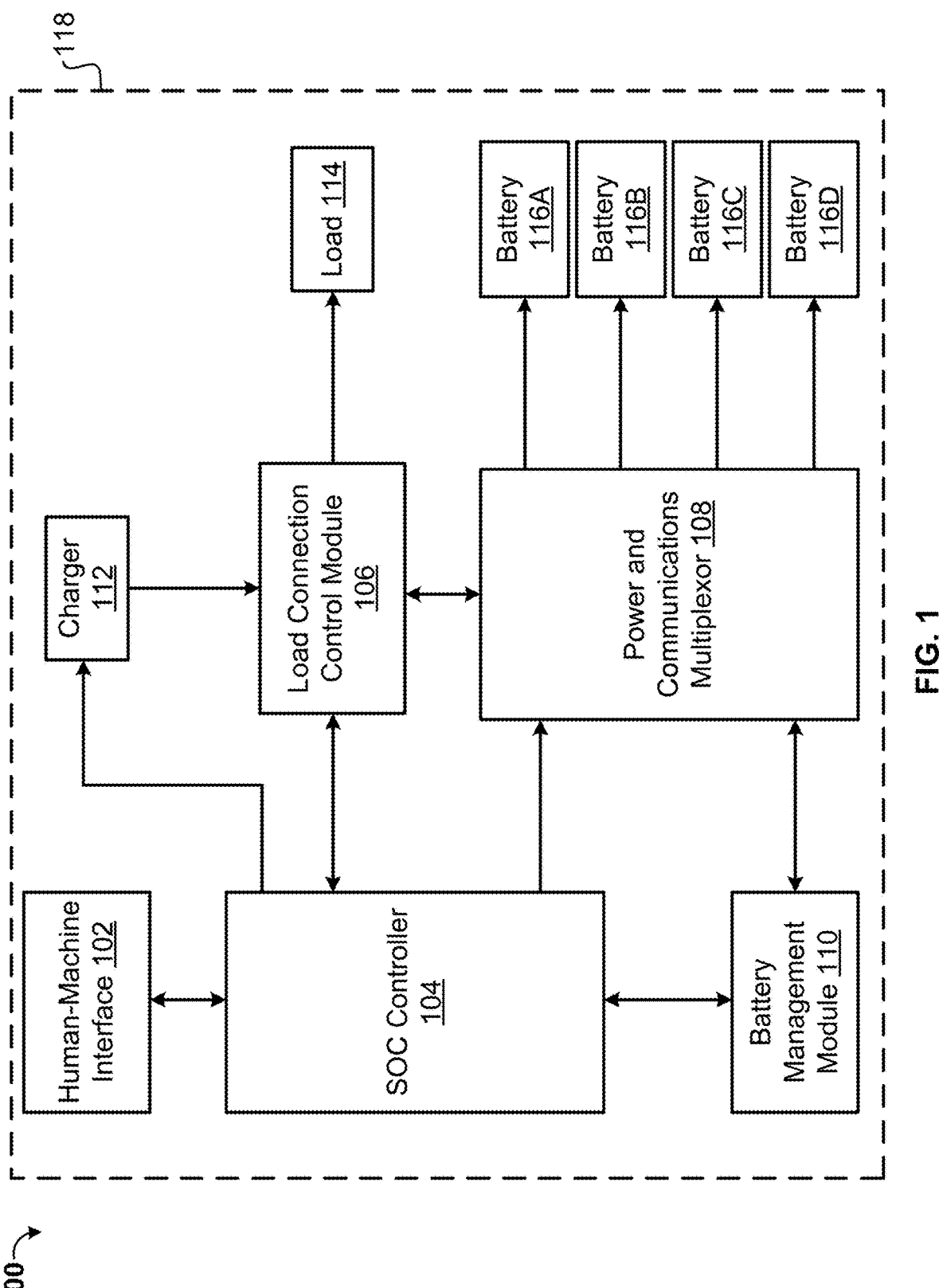
FIG. 1 is a functional block diagram of a state of charge (SOC) management system, according to one or more embodiments.

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may effect such feature, structure, or characteristic in connection with other examples, whether or not explicitly stated herein.

As previously described, a battery energy storage system (BESS), battery storage power station, battery energy grid storage (BEGS) or battery grid storage is a type of energy storage technology that uses a group of batteries in the grid to store electrical energy. Many BESS systems are composed of securely sealed battery packs, which are electronically monitored and replaced once their performance falls below a given threshold.

Batteries may each have individual states of charge (SOC) quantifies the remaining capacity available in a battery at a given time, which may be expressed as a percentage, with 0% being empty and 100% being full. In some implementations, these percentages may correspond to a current voltage of the battery in relation to the safe operating voltage range of the battery. For example, a 3.7 nominal volt lithium-ion cell may have a maximum voltage of about 4.2 volts (corresponding to 100% SOC) and a minimum voltage of about 3.0 volts (corresponding to 0% state of charge).

Different battery manufacturers may have their own recommended storage SOC for battery modules that are not in service, and such storage SOC may need to be maintained. When replacing a battery with a spare battery that is to be placed in service, the spare battery should have its SOC set to match the remaining batteries that are not being removed from the system.

The spare batteries, therefore, may be kept in a spares cabinet that may monitor the state of health and runtime capacity of the spare batteries and maintain the spare batteries at the ready to replace a battery in a live system in a timely manner.

Moreover, batteries suffer from cycle ageing, or deterioration caused by charge-discharge cycles. This deterioration is generally higher at high charging rates and higher depth of discharge and can cause a loss of performance (capacity or voltage decrease), overheating, and may eventually lead to critical failure (electrolyte leaks, fire, explosion). These risks are even more substantial as the industry transitions away from the use of lead-acid batteries to lithium-ion batteries, whose chemistry may require more specific charging parameters. It may be advantageous, therefore, to use a spares cabinet configured for the needs of lithium-ion batteries. Such a spares cabinet may be tailored for lithium-ion batteries by safely maintaining them at a given storage or transportation state of charge and may charge or discharge the spare batteries to a target state of charge to replace batteries in an external, live system.

Referring now to FIG. 1 a block diagram of a state of charge management system 100 (hereinafter, "system 100") is depicted according to one or more embodiments. The system 100 may include, among other things, a human-machine interface 102, a state of charge (SOC) controller 104, a load connection control module 106, a power and communications multiplexor 108, a battery management module 110, a charger 112, a load 114, one or more batteries 116A-D, and an enclosure 118. The batteries 116A-D may include lithium-ion battery modules. The batteries 116A-D may be, for example, 48-volt (nominal) modules that may have a voltage range of 40 to 58 volts. It may be appreciated that although four batteries 116A-D are depicted in FIG. 1, substantially any number of batteries may be included within the system 100.

The human-machine interface (HMI) 102 may be a primary graphical user interface (GUI) for one or more users of the system 100. For example, a technician may use the HMI 102 to set a SOC for a spare battery. The HMI 102 may be used to set charge, discharge, and float parameters, such as SOC, voltage, charge/discharge current, time, maintenance interval (i.e., how often the batteries are checked), ambient temperature, and/or battery temperature. These parameters may be readable and adjustable through the HMI 102. The HMI 102 may communicate these parameters to the SOC controller 104 and may display the status of each of the batteries 116A-D and/or the system 100. The HMI 102 may also communicate with an external building management system (not shown) to get SOC and state-of-health (SOH) information of spare battery modules (i.e., batteries 116A-D) within the system, as well as a last charge date of the battery modules.

In operation, when one of the batteries 116A-D may be installed in a live system or when a boost charge may be required for storage, the technician may use the HMI 102 to select a position of a battery module from among batteries 116A-D. The HMI 102 may be used to program the desired SOC and send these parameters to the SOC controller 104. Once the operation may be completed, the HMI 102 may inform the technician of completion to install the battery module in the live system. The HMI 102 may also allow a technician to put the system 100 into a maintenance mode to allow the technician to add or remove batteries from the system 100 safely. The HMI 102 may also provide alarms to the technician based on set limits for voltage, cell voltage, and temperature.

Figure 3A:
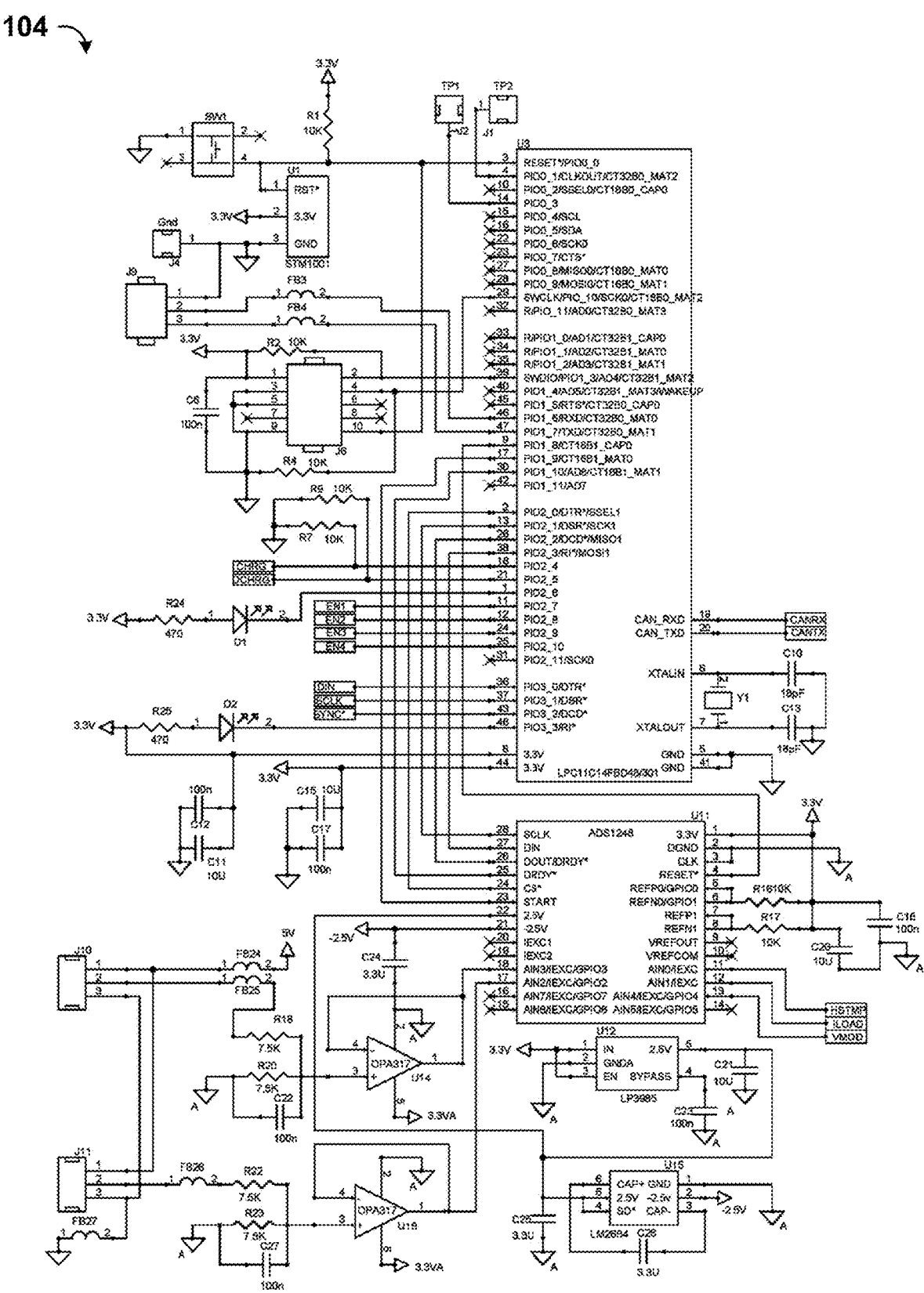
FIG. 3A is a circuit diagram of an example SOC controller of the SOC management system depicted in FIG. 1, according to one or more embodiments.

The SOC controller 104 may automatically maintain a target SOC of each battery 116A-D at a set interval. The SOC controller 104, by use of the power and communications multiplexor 108, may control switching between batteries 116A-D, engages the charger 112 or the load 114 to perform SOC adjustments. The SOC controller 104 may charge or discharge the batteries 116A-D to the target SOC for replacement in a live system. While the batteries 116A-D are in storage for use as spares, the SOC controller 104 may periodically switch communication to each battery 116A-D to check a current SOC. In the event a battery 116A-D may require a boost charge, the SOC controller 104 may automatically switch the battery 116A-D into the charging circuit until the battery 116A-D reaches a proper storage SOC level. The SOC controller 104 may check and maintain the batteries 116A-D in the system 100 over an interval of days, weeks, or months. The SOC controller 104 may read the SOC from the batteries 116A-D via the battery management module 110. Alternatively, if communication with one or more batteries 116A-D is not possible, the SOC controller 104 may direct the charger 112 to fully charge a module to 100% SOC and may then apply the load 114 at a constant current to allow for direct calculations of the time required to discharge the battery 116A-D to the desired end SOC. A circuit diagram of an example SOC controller 104 is depicted in FIG. 3A.

Figure 3B:
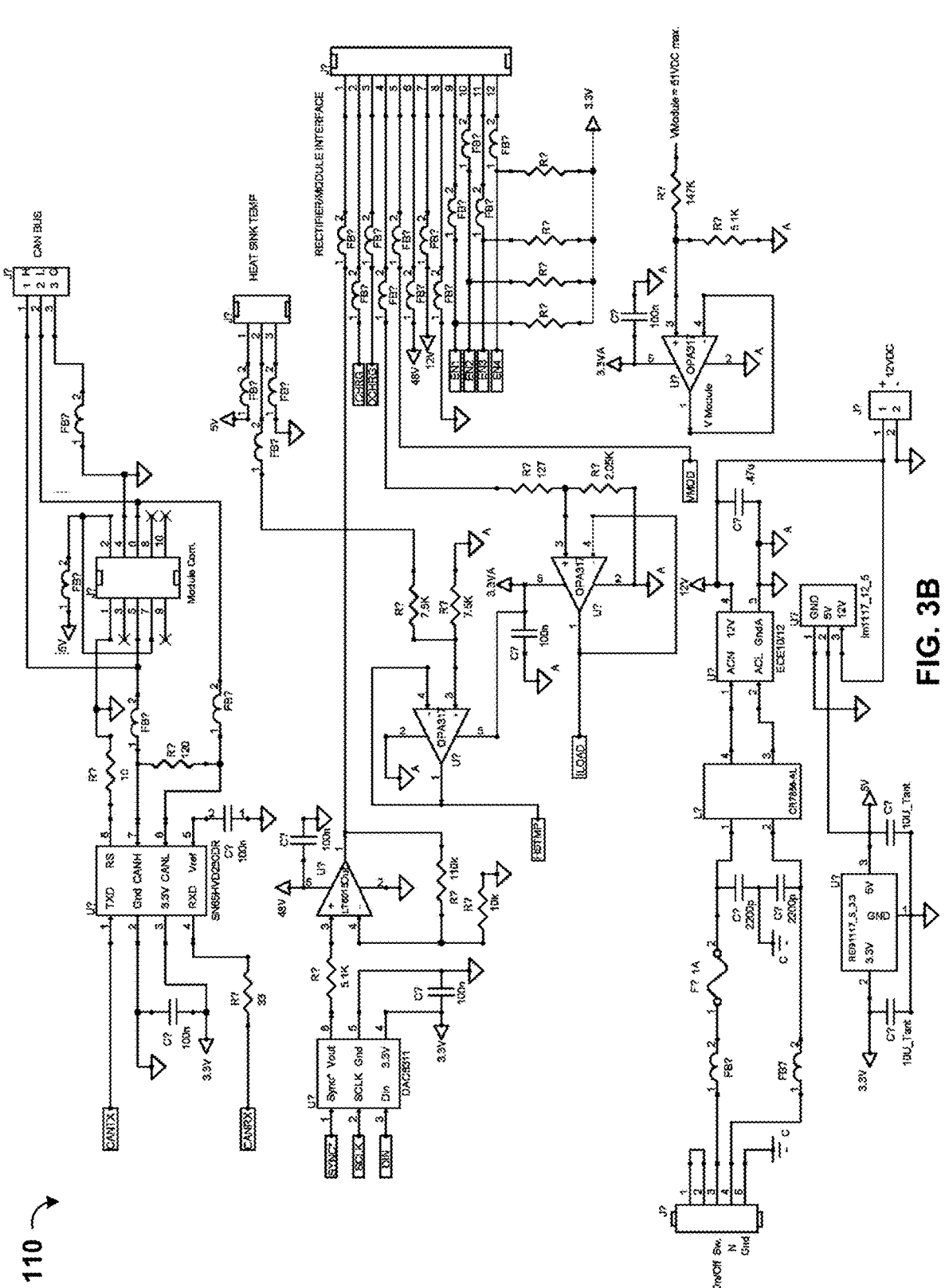
FIG. 3B is a circuit diagram of an example battery management module of the SOC management system depicted in FIG. 1, according to one or more embodiments.
Figure 3C:
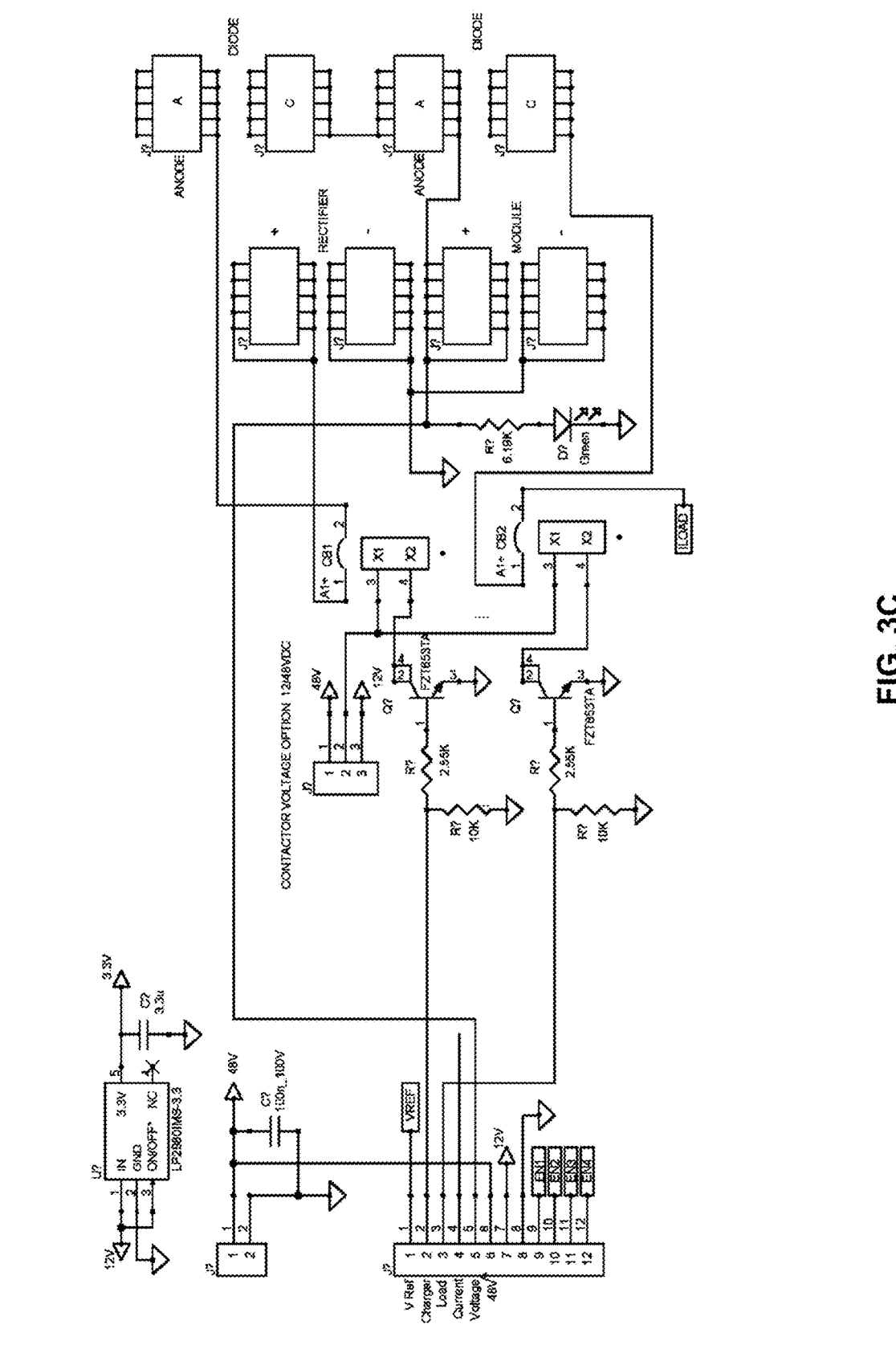
FIG. 3C is a circuit diagram of an example charger of the SOC management system depicted in FIG. 1, according to one or more embodiments.
Figure 3D:
FIG. 3D is a circuit diagram of an example load connection control module of the SOC management system depicted in FIG. 1, according to one or more embodiments.

The load connection control module 106 may be used to provide constant-current and constant-voltage charging and constant-current discharge by connecting and/or disconnecting the charger 112 and the load 114. The load connection control module 106 may physically and electrically couple and uncouple the charger and the load 114 to the batteries 116A-D via the power and communications multiplexor 108. The load connection control module 106 may also provide redundancy to the SOC controller 104 by monitoring load control signals sent to the SOC controller 104 and initiating a shutdown of charging or discharging based on temperature or other parameters exceeding limits. A circuit diagram of an example load connection control module 106 is depicted in FIG. 3D.

Figure 3E:
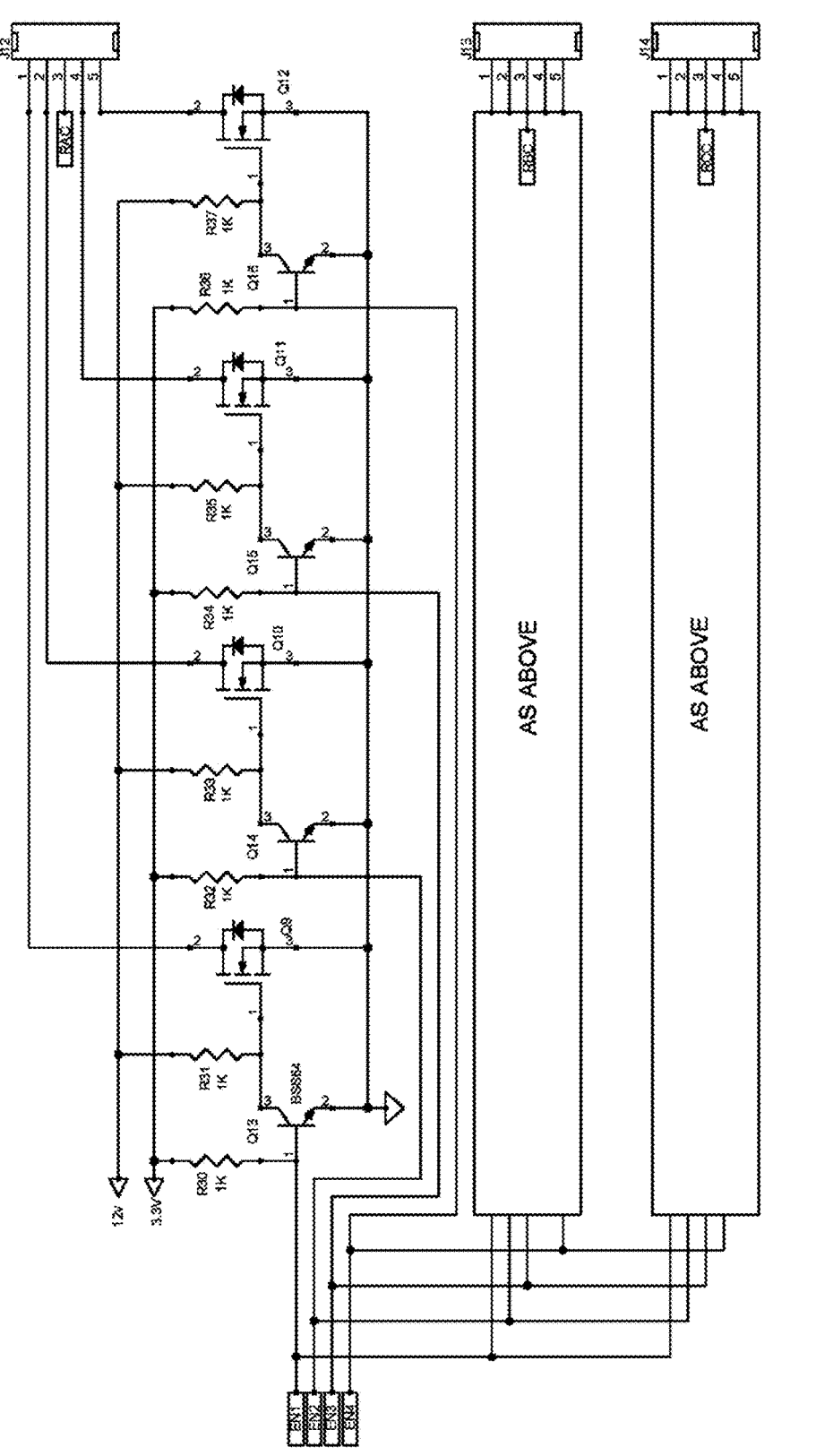
FIG. 3E is a circuit diagram of an example power and communications multiplexor of the SOC management system depicted in FIG. 1, according to one or more embodiments.

The power and communications multiplexor 108 may switch the communication and battery terminal connections to the selected modules being serviced. The power and communications multiplexor 108 may include an ADC to measure the voltage of each battery 116A-D. The power and communications voltage is preset, then there is a battery present in the slot. This can be done before connecting communications, loads or rectifiers. This automates the sensing of the batteries instead of depending on the user to select which slots have a battery installed. A circuit diagram of an example power and communications multiplexor 108 is depicted in FIG. 3E.

The battery management module 110 may communicate with the batteries 116A-D to extract SOC information of the batteries 116A-D. The battery management module 110 may be operatively coupled to the batteries 116A-D in order to allow the SOC controller 104 to retrieve the state of charge of the batteries 116A-D as a percentage, current and nominal voltage of the batteries 116A-D, temperature of the batteries 116A-D, and individual cell voltages of the batteries 116A-D. A circuit diagram of an example load connection control module 106 is depicted in FIG. 3B.

The charger 112 may be used for charging the batteries 116A-D as directed by the SOC controller 104 and the battery management module 110. The charge may be, for example, a rectifier, such as a 48-volt DC rectifier. The charger 112 may charge the batteries 116A-D with a current of up to 40 amps. However, it may be appreciated that substantially any safe charge current for the batteries 116A-D may be used. The charger 112 may be a voltage-controlled charger to fully charge the batteries 116A-D to 100% SOC when the ability to determine the SOC of the batteries 116A-D is not possible. The charger 112 may also include an adjustable-voltage float charger to keep the batteries 116A-D at a given SOC for direct replacement into a battery string. A circuit diagram of an example charger 112 is depicted in FIG. 3C.

Figure 3F:
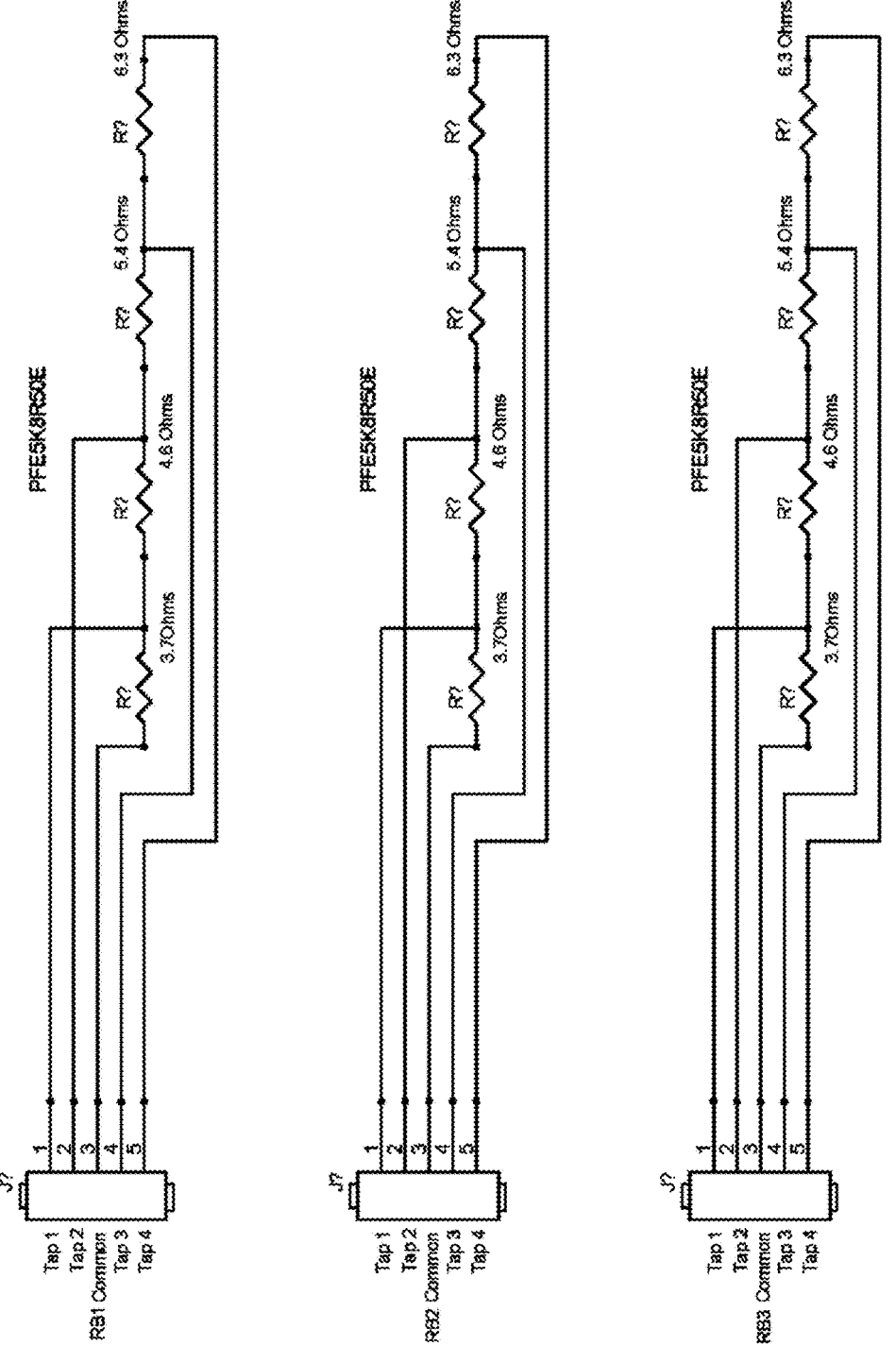
FIG. 3F is a circuit diagram of an example load of the SOC management system depicted in FIG. 1, according to one or more embodiments.

The load 114 may be used for discharging the batteries 116A-D as directed by the SOC controller 104 and the battery management module 110. The load 114 may be, for example, a resistor bank with a fan to allow for heat dissipation in order to minimize heat soak that may cause issues for the batteries 116A-D. By way of example and not of limitation, the load 114 may discharge the batteries 116A-D with a current of up to 10 amps. However, it may be appreciated that substantially any safe discharge current may be used. If the SOC is unable to be determined for the batteries 116A-D, the load 114 may be applied to the batteries 116A-D to discharge the batteries 116A-D after the charger 112 had charged the batteries 116A-D to 100% SOC. A desired end SOC value may be calculated based a time for the load 114 to discharge the batteries 116A-D with a constant-current load. A circuit diagram of an example load 114 is depicted in FIG. 3F.

The enclosure 118 may make up, for example, a spares cabinet that integrates the system 100 and four lithium-ion battery modules (i.e., batteries 116A-D), such that a state of charge of the battery modules can be maintained utilizing an integrated charger (i.e., charger 112) and load bank (i.e., load 114).

Thus, the system 100 may be used for several use cases. A first use case may include maintaining battery SOC during storage. The SOC controller 104 may cycle through each battery 116A-D in the spares cabinet and read the SOC for each respective battery 116A-D. If the SOC is not within a storage tolerance range, then the SOC controller 104 may charge or discharge the respective batteries 116A-D to achieve the set SOC level.

A second use case may include setting a SOC level for the batteries 116A-D for replacement in a live system or for transportation. For example, it may be appreciated that replacing a battery in a live system requires the spare battery SOC to match the SOC of the remaining batteries in the system or that regulations for transportation of batteries requires their state of charge to be less than a given threshold, such as 30% state of charge. Therefore, a technician may utilize the HMI 102 to set a SOC level for a battery 116A-D. The SOC controller 104 may charge or discharge the batteries 116A-D to the target SOC for replacement in the live system or in preparation for transportation.

A third use case may include installing or removing batteries. A user of the system 100 may cause the system 100 to enter a maintenance state (to be discussed in further detail below with respect to FIG. 2), in which the system 100 may halt operations and disconnect from the batteries 116A-D. The user may then install or remove batteries 116A-D from the system 100 safely.

For any of the above use cases, the system 100 may communicate either to a technician or directly to a live system to determine when a replacement battery may be needed at a given SOC and may charge or discharge the spare battery accordingly. In one or more implementations, the system 100 and the cabinet may be a dedicated, on-site component of a larger live system. In one or more implementations, the system 100 and the cabinet may be kept off-site and may be brought to the live system at the time of maintenance or servicing.

Figure 2:
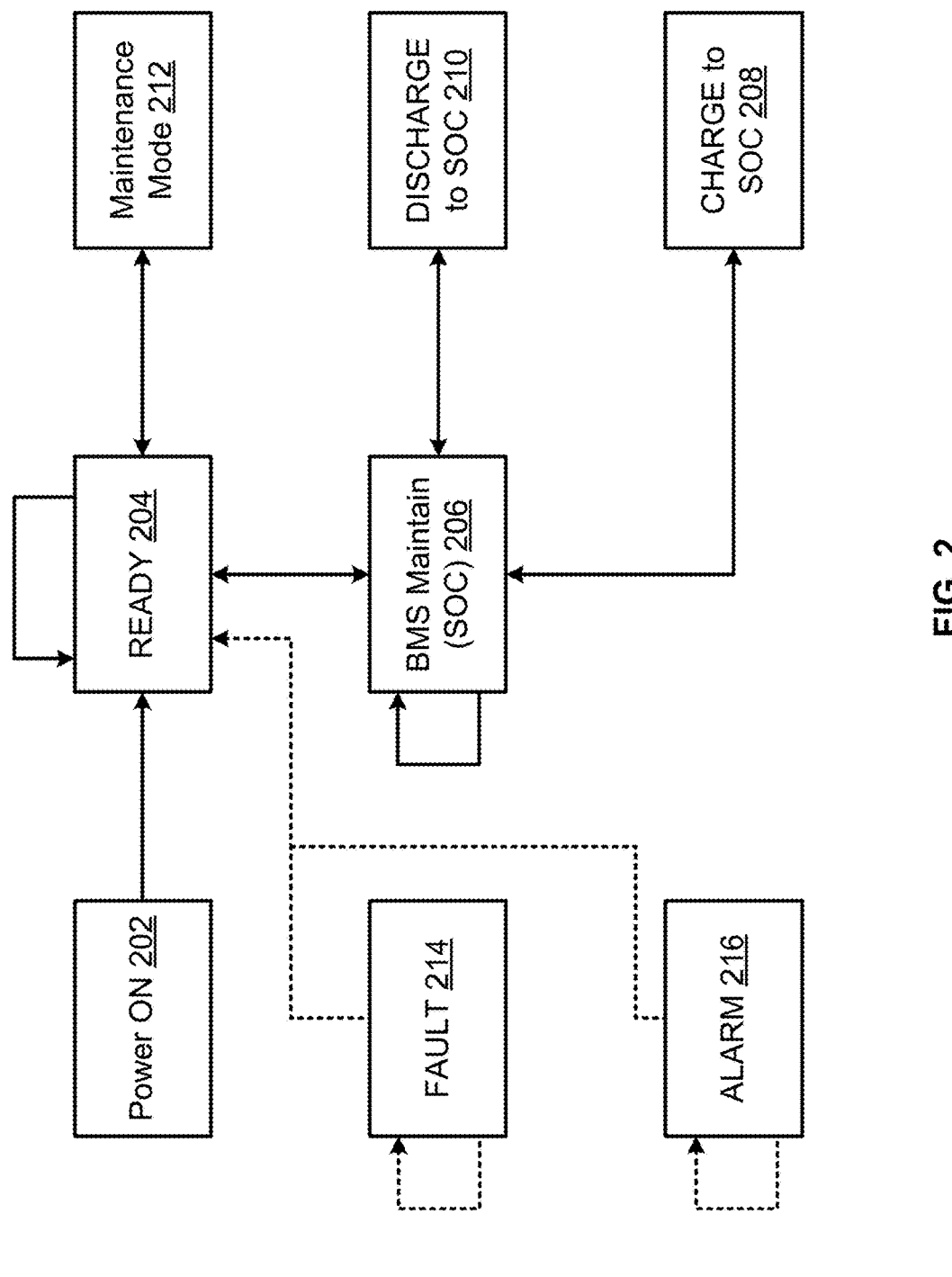
FIG. 2 is a state machine diagram of the SOC management system, according to one or more embodiments.

Referring to FIG. 2, a state diagram 200 for the system 100 (FIG. 1) is depicted according to one or more embodiments. The state diagram 200 may include a power ON state 202, a READY state 204, a BMS Maintain (SOC) state 206, a CHARGE to SOC state 208, a DISCHARGE to SOC state 210, a maintenance mode state 212, a FAULT state 214, and an ALARM state 216.

The power ON state 202 may be an initial start-up state when the system 100 is first powered on. The READY state 204 may disconnect all batteries 116A-D from the system 100 and wait for a command from the human-machine interface 102 or other input source, such as a webpage. The READY state 204 may also auto-transition to BMS Maintain (SOC) state 206 if an option is set in the system 100. The READY state 204 may also set a SOC target for each battery 116A-D and an interval between battery checks.

The BMS Maintain (SOC) state 206 may disconnect all batteries 116A-D from the system 100 and connect a voltage meter to determine whether each battery 116A-D is present. The BMS Maintain (SOC) state 206 may connect the battery management module 110 to the each battery 116A-D to read SOC, voltage, cell voltage, and temperature of each battery 116A-D. If a given battery from among the batteries 116A-D are at a target SOC level, the BMS Maintain (SOC) state 206 cycle to the next battery in the system 100. Otherwise, the BMS Maintain (SOC) state 206 my transition state to the CHARGE to SOC state 208 or the DISCHARGE to SOC state 210. Once the battery 116A-D is charged or discharged, the BMS Maintain (SOC) state 206 may cause the system 100 to evaluate if the target SOC is reached, proceed to the next battery 116A-D, and wait until the next interval period.

The CHARGE to SOC state 208 may setup a rectifer voltage limit and a current limit for the charger 112 to charge each battery 116A-D as needed. The CHARGE to SOC state 208 may cause the system 100 to connect the charger 112 to each battery 116A-D and monitor SOC, SOH, voltage, current, and temperature as each battery 116A-D charges. When the target SOC is reached, the CHARGE to SOC state 208 may cause the system 100 to disconnect all batteries 116A-D and transition to the BMS Maintain (SOC) state 206.

The DISCHARGE to SOC state 210 may cause the system 100 to connect one or more batteries 116A-D to the load 114. The SOC, SOH, voltage, current, and temperature of each battery 116A-D to be discharged may be monitored. When the target SOC is reached, the DISCHARGE to SOC state 210 may disconnect all batteries 116A-D and transition to the BMS Maintain (SOC) state 206.

The Maintenance Mode state 212 may provide a user-safe interaction with the system 100 to allow a technician to add or remove batteries 116A-D from the system 100. Specifically, the maintenance mode may automatically disconnect the batteries 116A-D from the system 100 to allow a technician to open the enclosure and handle the batteries 116A-D to add or remove them from the enclosure 118.

The FAULT state 214 may be an interrupt state to disconnect the batteries 116A-D from the system 100 should an error arise. The FAULT state 214 may arise as a result of rectifier communication loss, temperature sensor loss, or an error in any component of the system 100 that would cause unsafe operation for the charging, discharging, or maintenance of the batteries 116A-D. If the system 100 enters the FAULT state 214, the system 100 will remain in this state unless instructed by the HMI 102 or the webpage to return to the READY state 204.

The ALARM state 216 may be an additional interrupt state based on determining issues with the batteries 116A-D. The ALARM state 216 may cause the system 100 to disconnect all batteries 116A-D from the system 100, flag a battery from among batteries 116A-D with an alarm, and skip any flagged batteries.

It will be appreciated by persons of skill in the art that the methods described and the control of the apparatus shown in the figures may be embodied in machine-executable instructions, e.g. software, in firmware or in hardware, or in a combination of both. The machine-executable instructions can be used to cause a general-purpose computer, a special-purpose processor, such as a DSP, array processor, microprocessor or the like, that acts on the instructions to perform functions and actions described herein, operating as a particular machine.

Alternatively, the operations might be performed by specific hardware components that may have hardwired logic or firmware instructions for performing the operations described, or by any combination of programmed computer components and custom hardware components, which may include analog circuits, electromechanical components, or the like. The computer components may include Application Specific Integrated Circuits (ASIC), Field Programmable Gate Arrays (FPGA), or the like which may exist or are being developed and have the capability of configurable logical operations.

The methods may be provided, at least in part, as a computer program product that may include a non-volatile (non-transient) machine-readable medium having stored thereon instructions which may be used to cause a computer (or other electronic devices) to perform the methods, including the control and sensing of the operation of mechanical components and relevant voltages or currents. For the purposes of this specification, the terms "machine-readable non-transient storage medium" shall be taken to include any tangible medium that is capable of storing or encoding a sequence of instructions or data for controlling a computing machine or special-purpose hardware and that may cause the machine or special purpose hardware to be operable to perform any one of the methodologies or functions of the methods and which retains relevant data when the power to the device is interrupted. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; Flash memory, which may be NAND or NOR type; memory resistors; or electrical, optical, acoustical data storage medium, or the like. A volatile memory device such as DRAM may be used to store the computer program product provided that the volatile memory device is part of a system having a power supply, and the power supply or a battery provides power to the memory circuit for the time period during which the computer program product is stored on the volatile memory device. For purposes of claim interpretation, the storage memory for storing a computer program product (including software, computer programming instructions, or "code") is "non-transient," where such a definition is given the broadest interpretation in terms of applicable memory types and techniques consistent with governing case law. Functions that are performed by a computer operable to process and execute the code may be equivalently performed by an electronic circuit that performs the same or similar acts.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes or configures the processor of the computer or the equivalent device to perform or control an action or a produce a result, as is well known by persons skilled in the art.

When describing a particular example, the example may include a particular feature, structure, characteristic, or method step, but every example may not necessarily include the particular feature, structure, characteristic, or method step. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure, or method step characteristic in connection with other examples, whether or not explicitly described.

It is therefore intended that the foregoing detailed description be regarded as illustrative rather than limiting, and that it be understood that it is the following claims, including all equivalents, that are intended to define the spirit and scope of this disclosure.

What is claimed is:

1. A system for maintaining a state of charge of spare batteries, comprising:

a plurality of batteries, wherein each of the plurality of batteries has a given state of charge;

a charger configured to charge each of the plurality of batteries;

a load configured to discharge each of the plurality of batteries, wherein the charger and the load are configured to charge or discharge each of the plurality of batteries to a storage or transportation state of charge;

a controller configured to maintain each of the plurality of batteries at the storage or transportation state of charge by causing the charger or load to respectively charge or discharge one or more batteries from the plurality of batteries to a target state of charge for replacement of one or more batteries of an external system, wherein the target state of charge corresponds to a state of charge of remaining batteries of the external system;

a multiplexor configured to electrically couple each of the plurality of batteries to the controller, wherein one battery of the plurality of batteries is coupled at a given time; and a human-machine interface coupled to the controller, wherein the human-machine interface is configured to receive one or more inputs to the system and to display a current state of charge for each of the plurality of batteries, wherein the one or more inputs comprise the states of the charge of the one or more batteries of the external system.

2. The system of claim 1, wherein the controller is configured to, in response to being unable to communicate with a battery from among the plurality of batteries:
    charge the battery to a 100% state of charge;
    determine an amount of time for a constant-current load to discharge the battery from the 100% state of charge to the target state of charge;
    discharge the battery to the target state of charge by applying the constant-current load for the determined amount of time.

3. The system of claim 1, wherein the controller is configured to connect and/or disconnect the plurality of batteries from the system to allow batteries to be added and/or removed from the system.

4. The system of claim 1, further comprising a battery management module configured to communicate parameters for each of the plurality of batteries to the controller.

5. The system of claim 4, wherein the parameters for each of the plurality of batteries comprises, for each of the plurality of batteries:
    the current state of charge,
    a state of health,
    a voltage,
    cell voltages for each cell of the respective battery, and
    a temperature.

6. The system of claim 1, further comprising a load connection control module configured to physically and electrically couple and uncouple the charger and the load to each of the plurality of batteries.

7. The system of claim 1, wherein the plurality of batteries comprises one or more lithium-ion battery modules each having a nominal voltage of 48 volts.

8. A spares cabinet for maintaining a state of charge of spare batteries, wherein the spares cabinet comprises:
    an enclosure configured to enclose one or more components;
    a plurality of batteries stored within the enclosure, wherein each of the plurality of batteries has a given state of charge;
    a charger configured to charge each of the plurality of batteries;
    a load configured to discharge each of the plurality of batteries, wherein the charger and the load are configured to charge or discharge each of the plurality of batteries to a storage or transportation state of charge;
    a controller configured to maintain each of the plurality of batteries at the storage or transportation state of charge by causing the charger or load to respectively charge or discharge one or more batteries from the plurality of batteries to a target state of charge for replacement of one or more batteries of an external system, wherein the target state of charge corresponds to a state of charge of remaining batteries of the external system;
    a multiplexor configured to electrically couple each of the plurality of batteries to the controller, wherein one battery of the plurality of batteries is coupled at a given time; and
    a human-machine interface coupled to the controller, wherein the human-machine interface is configured to receive one or more inputs for the controller and to display a current state of charge for each of the plurality of batteries, wherein the one or more inputs comprise the states of the charge of the one or more batteries of the external system.

9. The spares cabinet of claim 8, wherein the controller is configured to, in response to being unable to communicate with a battery from among the plurality of batteries:
    charge the battery to a 100% state of charge;
    determine an amount of time for a constant-current load to discharge the battery from the 100% state of charge to the target state of charge;
    discharge the battery to the target state of charge by applying the constant-current load for the determined amount of time.

10. The spares cabinet of claim 8, wherein the controller is configured to connect and/or disconnect the plurality of batteries from the spares cabinet to allow batteries to be added and/or removed from the spares cabinet.

11. The spares cabinet of claim 8, further comprising a battery management module configured to communicate parameters for each of the plurality of batteries to the controller.

12. The spares cabinet of claim 11, wherein the parameters for each of the plurality of batteries comprises, for each of the plurality of batteries:
    the current state of charge,
    a state of health,
    a voltage,
    cell voltages for each cell of the respective battery,
    a temperature.

13. The spares cabinet of claim 8, further comprising a load connection control module configured to physically and electrically couple and uncouple the charger and the load to each of the plurality of batteries.

14. The spares cabinet of claim 8, wherein the plurality of batteries comprises one or more lithium-ion battery modules each having a nominal voltage of 48 volts.

15. A method for maintaining a state of charge of spare batteries, comprising:
    providing a system, comprising:
        a charger configured to charge a plurality of batteries,
        a load configured to discharge the plurality of batteries,
        a controller configured to maintain each of the plurality of batteries at a storage or transportation state of charge by causing the charger or load to respectively charge or discharge one or more batteries from the plurality of batteries to a target state of charge for replacement of one or more batteries of an external system, wherein the target state of charge corresponds to a state of charge of remaining batteries of the external system, and
        a multiplexor configured to electrically couple each of the plurality of batteries to the controller, wherein one battery of the plurality of batteries is coupled at a given time;
    disconnecting each of the plurality of batteries from the system, wherein each battery of the plurality of batteries has a given state of charge;
    reading one or more parameters of a battery from the plurality of batteries; and
    determining, based on the parameters, whether or not to charge or discharge the battery to a target state of charge.

16. The method of claim 15, wherein the parameters of the battery from the plurality of batteries comprise one or more of: a current state of charge, a state of health, a voltage, a temperature, and one or more cell voltages of the battery.

17. The method of claim 16, wherein charging the plurality of batteries comprises:

determining a voltage limit and a current limit for the charger;

sequentially connecting each of the plurality of batteries to the charger to charge each battery;

monitoring, as each respective battery charges, one or more of the parameters of the respective battery; and in response to each of the plurality of batteries being charged to the target state of charge, disconnecting the plurality of batteries from the charger.

18. The method of claim 16, wherein discharging comprises:

sequentially connecting each of the plurality of batteries to the load to discharge each battery, wherein the load is configured to discharge the batteries by a constant current;

monitoring, as each respective battery discharges, one or more of the parameters of the respective battery; and in response to each of the plurality of batteries being discharged to the target state of charge, disconnecting the plurality of batteries from the load.

19. The method of claim 15, wherein further comprising providing a fault or alarm state in response to one or more of: a component failure, a communication loss, or determining one or more issues with a battery from the plurality of batteries.

20. The method of claim 15, further comprising entering a maintenance state, wherein in response to entering the maintenance state, the system causes the plurality of batteries to be disconnected from the system to allow a user to add or remove batteries from the system.

\* \* \* \* \*